US012077100B2

(12) United States Patent
Tontsch

(10) Patent No.: US 12,077,100 B2
(45) Date of Patent: Sep. 3, 2024

(54) LIGHTING DEVICE, LIGHTING SYSTEM, AND MOTOR VEHICLE WITH LIGHTING SYSTEM

(71) Applicant: AUDI AG, Ingolstadt (DE)

(72) Inventor: Friedrich-Uwe Tontsch, Ingolstadt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 17/924,039

(22) PCT Filed: Mar. 18, 2021

(86) PCT No.: PCT/EP2021/056895
§ 371 (c)(1),
(2) Date: Nov. 8, 2022

(87) PCT Pub. No.: WO2021/223930
PCT Pub. Date: Nov. 11, 2021

(65) Prior Publication Data
US 2023/0173978 A1    Jun. 8, 2023

(30) Foreign Application Priority Data

May 8, 2020   (DE) .................. 10 2020 112 574.7

(51) Int. Cl.
*B60Q 3/62*      (2017.01)
*B60Q 3/14*      (2017.01)
(Continued)

(52) U.S. Cl.
CPC ............... *B60Q 3/62* (2017.02); *B60Q 3/54* (2017.02); *D03D 1/00* (2013.01); *D03D 15/292* (2021.01);
(Continued)

(58) Field of Classification Search
CPC ... B60Q 3/62; B60Q 3/54; B60Q 3/14; B60Q 3/745; B60Q 3/217; B60Q 3/283;
(Continued)

(56) References Cited

U.S. PATENT DOCUMENTS 4,234,907 A   11/1980  Daniel
5,042,900 A    8/1991  Parker
(Continued)

FOREIGN PATENT DOCUMENTS

DE   10 2013 020 715 A1   6/2015
DE   11 2016 006 984 T5   5/2019
(Continued)

OTHER PUBLICATIONS

Examination Report dated Nov. 3, 2020 in corresponding German Patent Application No. 10 2020 112 574.7 (7 pages).
(Continued)

*Primary Examiner* — Laura K Tso
(74) *Attorney, Agent, or Firm* — STAAS & HALSEY LLP

(57) ABSTRACT

The described examples relate to a lighting device for a motor vehicle with multiple optical fibers and multiple further fibers, which are woven to a two-dimensional fiber fabric. The multiple further fibers may be formed as multiple further optical fibers or as multiple non-optical fibers. The fiber fabric may be formed corresponding to a developed surface of multiple sides of a preset three-dimensional body, which may be generated by cutting and by selectively separating the multiple optical fibers and the multiple further fibers that are woven with each other, at a distal cut end of the fiber fabric.

7 Claims, 3 Drawing Sheets

(51) Int. Cl.
*B60Q 3/217* (2017.01)
*B60Q 3/283* (2017.01)
*B60Q 3/54* (2017.01)
*B60Q 3/74* (2017.01)
*D03D 1/00* (2006.01)
*D03D 15/292* (2021.01)
*D03D 15/547* (2021.01)
*F21V 8/00* (2006.01)

(52) U.S. Cl.
CPC ......... *D03D 15/547* (2021.01); *G02B 6/0005* (2013.01); *B60Q 3/14* (2017.02); *B60Q 3/217* (2017.02); *B60Q 3/283* (2017.02); *B60Q 3/745* (2017.02); *D10B 2401/20* (2013.01); *D10B 2505/12* (2013.01)

(58) Field of Classification Search
CPC ...... D03D 15/547; D03D 15/529; D03D 1/00; G02B 6/0005; G02B 6/001; D10B 2401/20; D10B 2505/12
USPC .......................................... 362/511, 556, 488
See application file for complete search history.

(56) References Cited

U.S. PATENT DOCUMENTS

| | | | |
|---|---|---|---|
| 5,709,448 A | 1/1998 | Jennings | |
| 6,628,885 B1* | 9/2003 | Wilkie | G02B 6/001 385/901 |
| 7,466,896 B2* | 12/2008 | Tao | D03D 15/49 385/38 |
| 10,060,587 B2* | 8/2018 | Greene | F21S 41/141 |
| 10,549,684 B2 | 2/2020 | Boshoku | |
| 11,268,218 B2* | 3/2022 | Yamamoto | D03D 11/02 |
| 2003/0044155 A1* | 3/2003 | Maiden | D04B 21/16 385/100 |
| 2006/0087864 A1* | 4/2006 | Peng | B60Q 1/56 362/555 |

FOREIGN PATENT DOCUMENTS

| | | |
|---|---|---|
| DE | 10 2018 203 860 A1 | 9/2019 |
| DE | 10 2020 112 574.7 | 5/2020 |
| FR | 2936592 A1 | 9/2008 |
| WO | PCT/EP/2021/056895 | 3/2021 |

OTHER PUBLICATIONS

International Search Report (Form PCT/ISA/210); mailed Jun. 18, 2021 in corresponding PCT Application No. PCT/EP2021/056895 (15 pages) (4 pages English Translation).

Written Opinion (Form PCT/IPEA/408); mailed Sep. 8, 2021 in corresponding PCT Application No. PCT/EP2021/056895 (5 pages).

Notification of Transmittal of Translation of the International Preliminary Report on Patentability (Form PCT/IB/338); mailed Nov. 10, 2022 in corresponding PCT Application No. PCT/EP2021/056895 (1 page).

International Preliminary Report on Patentability (Form PCT/IPEA/409); mailed Nov. 10, 2022 in corresponding PCT Application No. PCT/EP2021/056895 (17 pages) (6 pages English Translation).

* cited by examiner

LIGHTING DEVICE, LIGHTING SYSTEM, AND MOTOR VEHICLE WITH LIGHTING SYSTEM

CROSS-REFERENCE TO RELATED APPLICATIONS

This application is a U.S. national stage of International Application No. PCT/EP2021/056895, filed on Mar. 18, 2021, which claims the priority benefit of German Application No. 10 2020 112 574.7 filed on May 8, 2020. Both the International Application and the German Application are incorporated by reference herein in their entirety.

FIELD

The invention according to described examples relate to a lighting device for a motor vehicle. The lighting device includes multiple optical fibers and multiple further fibers, which are woven to a two-dimensional fiber fabric. Further, the described examples relate to a lighting system as well as to a motor vehicle with such a lighting system.

BACKGROUND

Optical fibers, which can transport light from a light source to a destination along their longitudinal or fiber direction in low-loss manner, offer numerous advantageous possibilities and properties. In particular, the optical fibers can be formed as polymeric optical fibers and for example be produced by injection molding. They are increasingly used in diverse fields of application, for example for a lighting device of a motor vehicle, which can be realized as an interior and/or exterior lamp. Optical fibers can be relatively thin and insensitive to mechanical stresses or damages, whereby a precise and damage-free arrangement of the optical fibers and assembly to a manageable group (e.g. as a fiber fabric) are possible. Herein, damage of the fiber surface is to be prevented or limited in order to counteract later light and efficiency losses due to scattering effects.

US 2009/0291606 A1, US 2006/0144460 A1 and DE 601 17 825 T2 each describe a fabric, which can include optical fibers in warp and/or weft direction.

U.S. Pat. No. 5,709,448 A discloses a lighting unit for a vehicle backseat, wherein optical fibers are used hereto.

DE 11 2016 006 984 T5 discloses a vehicle component with an illumination system. The same is apparent from DE 10 2018 203 860 A1.

U.S. Pat. No. 4,234,907 A discloses a light emitting cloth consisting of optical fibers.

The solutions known from the prior art each describe a fabric including optical fibers, the two-dimensional shape of which is only slightly variable.

SUMMARY

According to described examples, an arrangement and use of optical fibers oriented in defined manner may be allowed, which may be particularly simple and particularly efficient with respect to a usable light output, with installation space requirement as low as possible.

The examples may be recited by the subject matters of the independent claims. Advantageous configurations and developments of the examples may be specified in the dependent claims, in the description and in the figures.

The examples may be based on the realization that a light production, in particular in an interior of a motor vehicle, increases in importance. In order to keep an installation space requirement low, a surface-structured fiber fabric (fiber mat), which, besides a relatively flat arrangement (package) of optical fibers, also allows a positioning of a lighting entity (light source) deviating from the fibers in an alternative installation space, can for example be used for an extensively formed lighting device. Thus, a slightly deformed two-dimensional structure can be relatively simply realized, e.g. an area illumination of a door or an instrument panel of the motor vehicle. However, if a severely deformed surface of a three-dimensional member, e.g. a gearshift lever, is to be illuminated all over, then, such an extensive illumination is unsuitable for example due to a size of the member or the already integrated functionality thereof. In particular injection molded light guides are restricted with respect to their arrangement (package), a type of coupling-in and a shaping. Because an increased construction height exceeding an available installation space (for example due to overlap) and a deformation of the optical fibers extending beyond the rupture strength would for example be required hereto. This is counteracted by the examples.

In an example, a lighting device for a motor vehicle is provided. The lighting device includes multiple optical fibers and multiple further fibers, wherein the multiple further fibers are formed as multiple further optical fibers or as multiple non-optical fibers. The multiple optical fibers and/or the multiple further optical fibers within the meaning of the examples describe so-called fibers formed as light guides for transferring and/or for guiding light. Such fibers can be polymeric optical fibers (POF) of plastic, but also of (quartz) glass fibers or the like. Each of these fibers includes a light transporting core and a jacket surrounding the core. The jacket has a slightly lower refractive index than the core such that a coupled-in light radiation is guided due to a total reflection on an interface layer to the core. The jacket can mechanically protect the core from stress from the outside. An overstress of the jacket, i.e. a damage of a fiber surface for example by scratching, can result in an undesired light exit due to different refractive indices. For example, the light radiation can be coupled from a LED light source into each of the optical fibers or a fiber bundle. If the multiple further fibers are the multiple non-optical fibers, they can for example be composed of a yarn, of natural fibers, of synthetic fibers or the like, thus be a fiber or a fiber material. Each of the fibers can for example have a diameter between 0.1 and 0.5 millimeters, in particular between 0.2 and 0.3 millimeters, and/or a minimum bending radius between 1 and 5 millimeters, in particular between 1.5 and 2.5 millimeters.

The multiple optical fibers and the multiple further fibers are woven to a two-dimensional fiber fabric. Thus, they can commonly form a textile sheet structure (fiber mat), which includes warp and weft threads. Therein, the warp threads extend in a longitudinal direction of the fiber fabric, i.e. parallel to a fabric edge, and the weft threads extend in a transverse direction, i.e. parallel to the fabric border. The warp and the weft threads intersect each other on a fabric surface included by the fiber fabric at an angle of exactly or approximately 90 degrees, i.e. they are rectangularly crossed with each other and therein extend one above the other and one below the other such that the fiber fabric arises. The manufacture of the fiber fabric can be effected by a mechanical weaving machine. In particular, the fiber fabric can be a flat fabric. The fiber fabric can for example have a maximum thickness between 0.5 and 1.0 millimeters. Alternatively or additionally, the fiber fabric can also be formed as a knitwear (knitted and/or hosiery goods).

It is provided that the fiber fabric is formed corresponding to a developed surface of multiple sides of a preset three-dimensional body. In other words, a fabric surface of the fiber fabric corresponds to a developed surface of the body. The body can in particular be formed as a hollow body. By a development of the surface within the meaning of the examples, one understands a spreading of the surface in a plane such that lengths (measured on an original surface) are retained. Thus, the developed surface can for example represent a so-called mesh of the body (body mesh) or the unfolding thereof as a template, wherein a model of the body can be produced by wrapping of the thus formed fiber fabric. For developing, a 3D CAD system (e.g. SolidWorks) can for example be used, which can nearly automatically create the development based on a geometry of the body. Here, it can for example be required to consider a corresponding bending reduction, i.e. a correction deduction for an elongation of each of the multiple optical and/or further fibers comprising the fiber fabric in bend-forming. Alternatively or additionally, a scaling factor can be taken into account in the developed surface such that the fiber fabric is slightly larger than the body in wrapping and forms a coating for the body instead of the model. For example, the body can be formed as a gearshift lever in the motor vehicle.

In order to provide the fiber fabric formed corresponding to the developed surface, it is provided that the fiber fabric is generated by cutting. Thus, the fiber fabric is partially or completely split, i.e. severed, into at least two parts. For example, cutting can be realized by methods and tools known per se, for example by mechanically separating by a cutting device (e.g. rolling knife, water jet), by scoring and subsequently breaking and/or a laser cutting device. Additionally, the fiber fabric thus formed is generated by selective separation of the multiple optical fibers and the multiple further fibers, which are woven with each other, at a distal cut end of the fiber fabric such that they protrude at a fabric end in separated manner. Thus, the fiber fabric includes the distal cut end after cutting, wherein, starting from it, an area of the fiber fabric is unwoven up to the fabric end. Thus, the unwoven fibers exit from the fabric end. If they are unwoven optical fibers, they can be coupled to the light source. Alternatively or additionally, unwoven, non-optical fibers can be used for a mechanical attachment of the fiber fabric to the body. Hereby, the advantage arises that a production of the fiber fabric can be inexpensively effected as yard goods independently of the developed surface. Alternatively or additionally, it can be provided that cutting and/or selectively separating can be at least partially supplemented by or replaced with corresponding shape weaving (e.g. circularly weaving) for realizing the developed surface. In particular with omission of cutting and/or selectively separating, the model and/or the coating of the body can be produced from the fiber fabric without such an intermediate step.

Thus, the fiber fabric can have a rectangular surface in weaving. By cutting and selectively separating, the fiber fabric is generated according to the developed surface. The developed surface can for example have a T or a cross shape. Therein, the developed surface is smaller than the rectangular surface. In particular, the rectangular surface is a minimally surrounding rectangle of the developed surface.

Hereby, the advantage arises that the two-dimensional fiber fabric can provide the model of the and/or the coating for the three-dimensional body by folding. Therein, overlap of the fiber fabric can be omitted and thus a construction corresponding to the thickness of the fiber fabric of 0.5 to 1.0 millimeters can be realized.

It is provided that the multiple optical fibers and/or the multiple further fibers formed as multiple further optical fibers, which protrude from the fabric end, are bundled to the fiber bundle, thus are combined. While the fibers, before this bundling, can be flatly juxtaposed or arranged in particular in a woven state, thus can form the two-dimensional fiber fabric, the fibers in the fiber bundle can extend next to each other and one above the other. In the fiber bundle, the fibers can thus extend analogously to braids or individual conductors of a cable. Furthermore, the fiber bundle is jacketed with a protective shell. Here, that area of the fibers, in which they are bundled, is thus surrounded or enveloped by a jacket. For example, this jacket can be formed as a fabric hose (e.g. shrinking hose) or the like and be wrapped around the fiber bundle or be mounted on or shifted onto the fiber bundle in fiber direction. By the jacket, a surface of the fibers external in the fiber bundle is advantageously protected from exterior mechanical influences and damages and the fibers are kept together in the fiber bundle. In addition, the fiber bundle has a coupling element for coupling light into the fiber bundle on a face side. Thereto, the light source can for example be positioned on the face side. In order to therein particularly advantageously minimize coupling-in or reflection losses, the bundled fibers, thus the fiber bundle, can include the coupling element. The coupling element can for example be formed as a plug element and in particular be realized by a resiliently mounted cylindrical sleeve for fiber inclusion (a so-called ferrule). The sleeve can be manufactured of metal, plastic or ceramic, wherein it and the inserted fibers are ground or polished. Alternatively, the coupling element can also be a splice element.

In order to provide a lighting device with a particularly flexible lighting characteristic (e.g. lighting intensity, lighting color), it is provided that the fiber fabric formed corresponding to the developed surface comprises at least two lighting areas different from each other. These lighting areas differ in the number of sides, which each comprise the fiber bundle. Thus, it is thereby preset, on how many sides light can each be coupled into the fiber bundle. A first lighting area comprises the fiber bundle with the coupling element only on one of the sides. Thus, the first lighting area is formed to introduce light only on the first side. Alternatively or additionally, a second lighting area each includes the fiber bundle with the coupling element on at least two sides of the fiber fabric. Two of the at least two sides can be opposing each other. Thereby, light can be coupled in on two sides of the fiber fabric opposite to each other. Thus, guiding of light is also possible in reverse direction through the optical fibers. Alternatively or additionally, the two of the at least two sides are arranged normally, i.e. rectangularly, to each other. Thus, the light can be coupled in from two, three or four sides of the fiber fabric by the second lighting area. In particular, the at least two lighting areas can be selectively controlled by a control device such that the fiber fabric intrinsically homogenously shines.

In an example, a lighting system for a motor vehicle is provided. The lighting system includes a lighting device and a three-dimensional body. The lighting device may be formed according to the described examples. The lighting device comprises multiple optical fibers and multiple further fibers, which are woven to a two-dimensional fiber fabric. Therein, the multiple further fibers are formed as multiple further optical fibers or as multiple non-optical fibers. The multiple optical fibers as well as the multiple further fibers and the fiber fabric can be formed as already discussed in context of the lighting device according to the examples. The body comprises a surface, which includes multiple sides of the body and at least partially delimits the body. The body can in particular be formed as a hollow body. Thus, the surface envelopes the body and an internal space provided by it at least in certain areas. Further, the fiber fabric is formed corresponding to the developed surface of the body. A development within the meaning of the examples is already described in context of the lighting device according to the described examples. Hereby, the advantage arises that the two-dimensional fiber fabric can provide a model of the and/or a coating for the three-dimensional body by folding. Therein, a construction without overlap can be realized. Alternatively or additionally, at least one further fiber fabric can be present such that the fiber fabric and the at least one further fiber fabric can each represent a segment for the model and/or the coating.

An advantageous example provides that the fiber fabric is at least partially arranged on the surface of the body, wherein the fiber fabric herein comprises a bending edge, a bending angle and/or a bending radius. Thus, the fiber fabric can be transferred from an extensive two-dimensional shape into a three-dimensional one by bend-forming. Herein, it may be required to preset a relevant characteristic, which can be defined by the bending edge, the bending angle and/or the bending radius. Thereby, the fiber fabric can advantageously be reproducibly reformed. Herein, it can be required to take into account a bending reduction in the developed surface in a planned bending (and/or compression). Alternatively or additionally, at least two edges of the fiber fabric abut on each other in flush manner. Thus, that area, in which the at least two edges adjoin to each other, is formed without overlap. The at least two edges can for example form a butt joint or corner joint. Thereby, the construction without overlap can be particularly simply provided.

An advantageous example provides that the fiber fabric comprises a partially translucent protective layer. Thus, the protective layer covers the fiber fabric on a fiber surface. The protective layer can advantageously protect the fiber fabric against influences from an environment as well as change a haptic and/or an optical property of the fiber fabric. For example, the protective layer can be formed as a foil of metal (e.g. aluminum) and/or of plastic. A leather material (e.g. genuine leather, artificial leather, leather fiber material) or a textile material can also form the protective layer. In order to realize a partial translucence of the protective layer, the protective layer itself or the inclusions thereof can allow a transmission of light beams at least in certain areas, i.e. be transparent for a passage of the light beams. Alternatively or additionally, the protective layer can be at least partially opaque (i.e. completely or only from a certain layer thickness) and comprise a perforation formed as a passage opening and/or as a blind opening for providing the partial translucence. Alternatively or additionally, the thus arranged fiber fabric is attached to the surface of the body by a joining material, wherein the respective fibers are additionally fixed to each other. The joining material can be an adhesive and/or a casting compound, which respectively chemically and/or physically cures. The joining material connects the fiber fabric to the body as well as the respective fibers to each other by surface adhesion and internal strength (cohesion). In particular, the joining material can be a resin synthetically produced by polymerization, polyaddition or polycondensation reactions. Hereby, the advantage arises that due to an extensive force transfer, a uniform force distribution can be achieved across an entire joining surface and damage of the fiber fabric in attaching by e.g. a drill hole for an attaching element (e.g. rivet and/or screw) can be prevented. Tolerances of the body and/or the fiber mat caused by manufacture can also be compensated for by the joining material.

An advantageous example provides that the body is a hollow body and the surface of the hollow body comprises an opening to the internal space of the hollow body. Thus, the surface of the hollow body is interrupted in sections, wherein the internal space is accessible from the outside, i.e. an environment of the hollow body, through the opening. The multiple optical fibers and/or multiple further fibers protruding from the fabric end are bent towards the internal space of the hollow body through the opening. Thus, selectively separated and therefore exposed fibers can for example be folded inwards such that they can form a fold. Thereby, the optical fibers bundled as a fiber bundle also protrude into the internal space. The fiber bundles can be guided to a coupling-in device of the lighting system through the internal space. The coupling-in device can for example be realized as a light beams emitting semiconductor component (light emitting diode or LED, e.g. a LED element, micro LED element and/or RGB LED element) or another light source. The fiber bundle guided through the internal space is connected to the coupling-in device in optically conducting manner via a coupling element. The coupling element may be a coupling element already previously described in context of the lighting device according to the examples (e.g. plug and/or splice element). By such an arrangement and guide of the fibers, they are particularly protected from environmental influences. In addition, a spatial distance between the fiber fabric and the coupling-in device can be simply overcome, whereby a position of the coupling-in device can be set optimized in terms of installation space.

An advantageous examples provides that each of the multiple optical fibers and/or each of the multiple further optical fibers formed as multiple further optical fibers comprise a core and a coating enveloping the core. The coating can prevent an undesired radiation loss in light transport. In order to be able to use the optical fibers additionally also as radiating elements, the coating comprises a gap. The gap is a purposefully introduced disturbance in a core-jacket interface. Thereby, a lateral emission of light can be achieved. Such optical fibers are also referred to as laterally emitting fibers. According to arrangement of an area with intact coating (total reflection) and an area with the gap in the coating (transmission of light), a characteristic illumination of the fiber fabric can be effected. Herein, a characteristic of the gap itself (e.g. diameter) and/or a number of multiple gaps (e.g. gap density). For example, the gap can be generated by laser cutting (ablation) or a comparable method. In particular, the gap can be applied after weaving and/or arranging the fiber fabric on the surface. Therein, the gap is respectively arranged only in a lift area of the fiber fabric. Herein, the lift area describes a warp lift (i.e. if a respective warp thread is above the respective weft thread) and/or a weft lift (i.e. if a respective weft thread is above the respective warp thread). In arrangement of the fiber fabric on the body, the lift area can be located on a side of the fiber fabric opposite to the surface. Thereby, it can be particularly advantageously ensured that light is only emitted in a section of the fiber fabric visible from the outside.

Developments of the lighting system according to the examples, which comprise features as they have already been described in context of the developments of the lighting device according to the examples, also belong to the invention according to the described examples and vice versa. For this reason, the corresponding developments of the lighting system according to the described examples are not again described here.

In an example, a motor vehicle with a lighting system is provided. The lighting system may be formed as an example of the lighting system according to the described examples. In an example, the motor vehicle is configured as a car, in particular as a passenger car or a truck, or as a passenger bus or a motorcycle. The motor vehicle includes a three-dimensional body, which is arranged as a trim element and/or as an operating element in an interior of the motor vehicle. For example, the operating element is a gearshift lever or a steering wheel. By the lighting system, an action to be performed in connection with the operation of the motor vehicle (e.g. an advantageous gear change depending on a rotational speed) and/or a current setting (e.g. a drive mode or a selected gear) can in particular be represented. The trim element can for example mask a vehicle door.

Developments of the motor vehicle according to the examples, which comprise features as they have already been described in context of the developments of the lighting system according to the examples, also belong to the invention according to the examples and vice versa. For this reason, the corresponding developments of the motor vehicle according to the examples are not again described here.

In an example, a method for providing a lighting system for a motor vehicle is provided. In an example, the lighting system is formed as an example of the lighting system according to the examples. The lighting system includes a lighting device with multiple optical fibers and multiple further fibers, wherein the multiple further fibers are formed as multiple further optical fibers or as multiple non-optical fibers. Further, the lighting system includes a three-dimensional body with a surface, which at least partially delimits the body. In a first step of the method, the multiple optical fibers and the multiple further fibers are woven to a two-dimensional fiber fabric. In a second step, which can be performed temporally before, after or at the same time with the first step, the developed surface of the hollow body is captured. In a final third step, the fiber fabric is formed corresponding to the developed surface of the body. In particular, the third step can be effected temporally after the first and the second step. Alternatively or additionally, it can be provided that the first and the third step are performed in combined manner, wherein the developed surface of the body is already taken into account in producing the fiber fabric.

Developments of the method according to the examples, which comprise features as they have already been described in context of the developments of the lighting system according to the examples, also belong to the invention according to the examples and vice versa. For this reason, the corresponding developments of the method according to the examples are not again described here.

The described examples also include combinations of the features of the described examples.

BRIEF DESCRIPTION OF THE DRAWINGS

These and other aspects and advantages will become more apparent and more readily appreciated from the following description of the examples, taken in conjunction with the accompanying drawings of which.

DESCRIPTION

Figure 1:
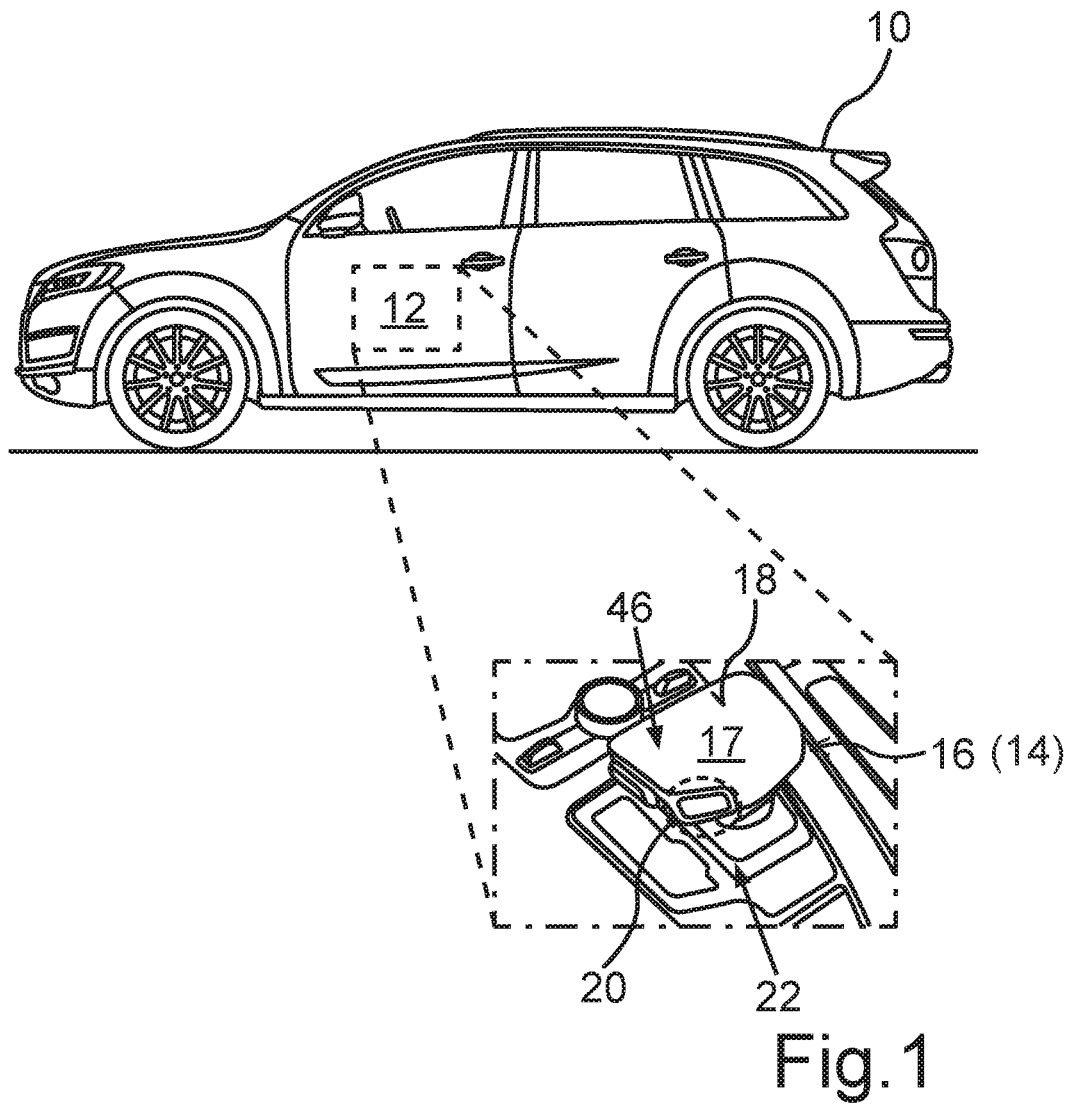
FIG. 1 is a schematic representation of a motor vehicle.

The examples explained in the following are examples of the invention. In the examples, the described components of the examples each represent individual features of the examples to be considered independently of each other, which also each develop the examples independently of each other. Therefore, the disclosure is to include also combinations of the features of the examples different from the illustrated ones. Furthermore, the described examples can also be supplemented by further ones of the already described features of the examples.

In the figures, identical reference characters each denote functionally identical elements.

FIG. 1 exemplarily shows a motor vehicle 10, wherein a part of an interior 12 of the motor vehicle 10 is partially illustrated in enlarged manner. It includes a selector lever (gear stick) 14 formed as an operating element. Thus, the selector lever 14 is a three-dimensional body 16. The body 16 is formed as a hollow body and comprises an internal space 17 for receiving an electronic member of the selector lever 14, which is delimited by multiple sides of a surface 18 and therefore not visible from the outside for an observer (e.g. a vehicle occupant). Furthermore, the body 16 can comprise a schematically indicated opening 20 in the surface 18, through which the electronic member can for example be serviced or exchanged. In order to illuminate the body 16 formed as a selector lever 14, for example to optically present a currently selected gear (e.g. "P"), a lighting system 22 is provided.

Figure 2:
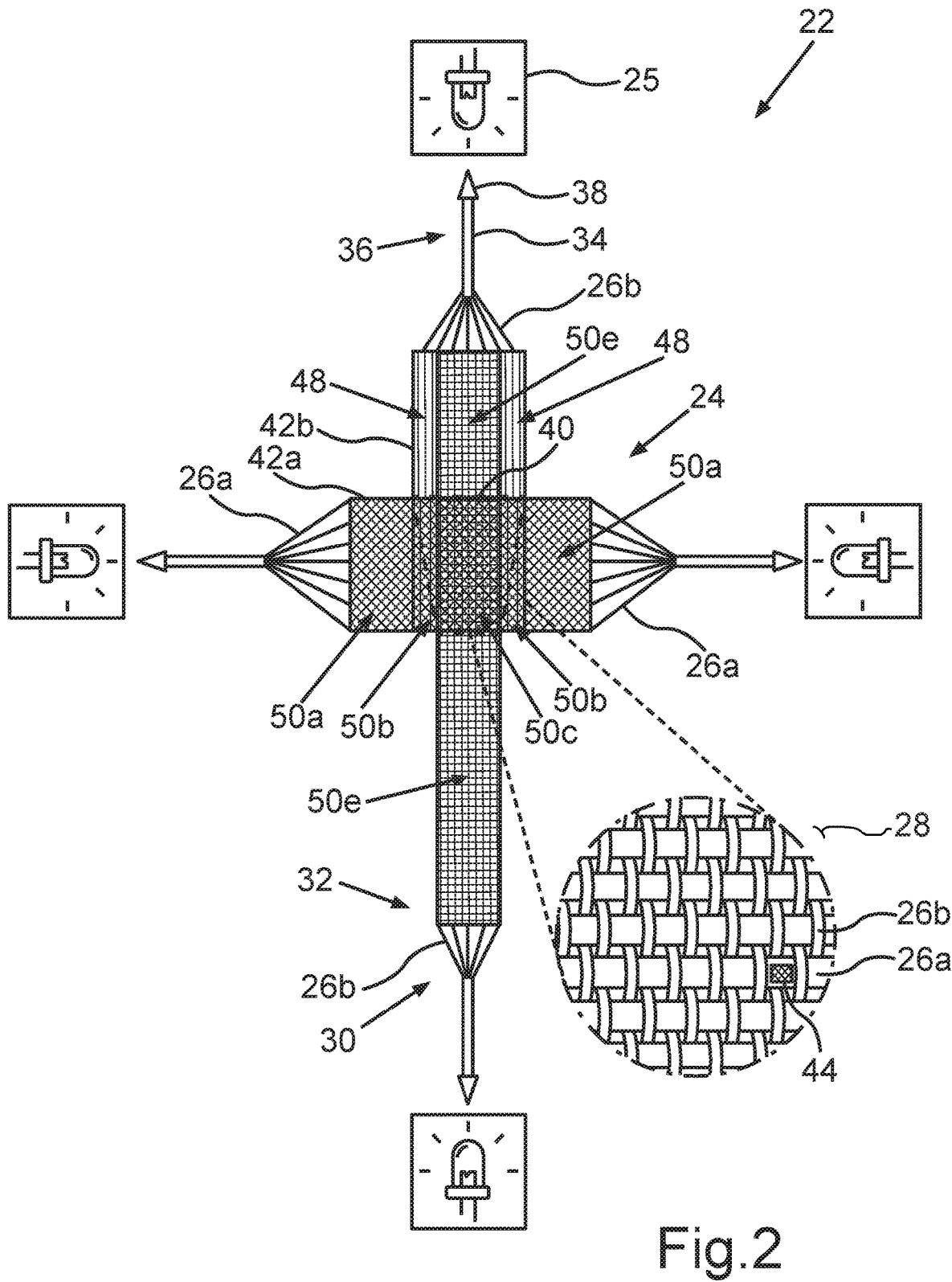
FIG. 2 is a schematic representation of a lighting system for the motor vehicle.

The lighting system 22 and an associated lighting device 24 are schematically depicted in the representation shown in FIG. 2 in detailed manner, wherein FIG. 2 makes reference to the components shown and described in context of FIG. 1. However, a representation of the body 16 of the lighting system 22 already shown in FIG. 1 is herein omitted. Furthermore, with presence of multiple components identical in member, each only one thereof has a reference character in FIG. 2. Besides the shown lighting device 24, the lighting system 22 comprises four coupling-in devices 25 as respective light sources, which are for example formed as LED lamps.

The lighting device 24 itself includes multiple optical fibers 26a and multiple further fibers 26b, which are woven to a two-dimensional fiber fabric 28 as warp and/or weft threads, as it is also partially illustrated in enlarged manner. Presently, the multiple further fibers 26b are also formed as optical fibers. Alternatively or additionally, these fibers 26b can also be non-optical. The fiber fabric 28 is formed corresponding to the developed surface 18 of the three-dimensional body 16. Hereto, the fiber fabric 28 is transferred into a required cross shape by cutting. Furthermore, fibers 26a, 26b woven with each other are selectively separated respectively on four distal cut ends 30 of the fiber fabric 28 such that they protrude separated at a fabric end 32. The fibers 26a, 26b protruding from the respective fabric end 32 are each bundled to a fiber bundle 34. Each of the fiber bundles 34 is jacketed by a protective shell 36 (e.g. shrinking hose). Furthermore, each of the fiber bundles 34 comprises a coupling element 38 (ferrule) on a face side for coupling light into the fiber bundle 34, i.e. for connecting the fiber bundle 34 to the coupling-in device 25 in optically conducting manner.

In order to arrange the fiber fabric 28 at least partially on the surface 18 of the body 16, it can for example comprise four schematically indicated bending edges 40. If the fiber fabric 28 is folded along these bending edges 40, then, each two edges 42a, 42b of the fiber fabric 28 abut on each other in flush manner, i.e. without overlap. Herein, the fiber fabric 28 can be attached to the surface 18 by a joining material (e.g. adhesive), which additionally fixes the respective fibers 26a, 26b to each other. In addition, the fibers 26a, 26b protruding from the fabric end 32 can also be bent towards the internal space 17 of the body 16 through the opening 20 such that the fiber bundle 34 is guided to the coupling-in device 25 through the internal space 17.

In order to emit the light coupled-in and transported by the coupling-in devices 25 in lateral manner, i.e. in radial direction, from the optical fibers 26a, 26b, a coating enveloping a core of the fibers 26a, 26b can comprise a gap 44, as is only shown centrally in a lift area of the fiber 26a in the enlarged section of the fiber fabric 28 for the sake of overview.

Since the fiber fabric 28 is formed corresponding to the developed surface 18 and thus can also be irregularly (e.g. asymmetrically) formed, lighting areas 48, 50a, 50b, 50c, 50e different from each other result from it. In a lighting area 48, each only one side comprises the fiber bundle 34 formed of the fibers 26a with the coupling element 38. Thus, light is only coupled in on one side. In a lighting area 50a, two sides oriented opposite to each other each comprise the fiber bundle 34 with the coupling element 38. Thus, light can each be coupled into the fibers 26a, 26b from two sides. Analogously hereto, light can be coupled in from three sides in a lighting area 50b and from four sides in a lighting area 50c, 5e.

If a protective layer 46 is additionally arranged on the fiber fabric 28 (see hereto a cladding of the selector lever 14 in a grip area for the vehicle driver in FIG. 1), a partial translucence of the protective layer 46 is required. It can for example be realized by a material characteristic or an opening in the protective layer 46.

Figure 3:
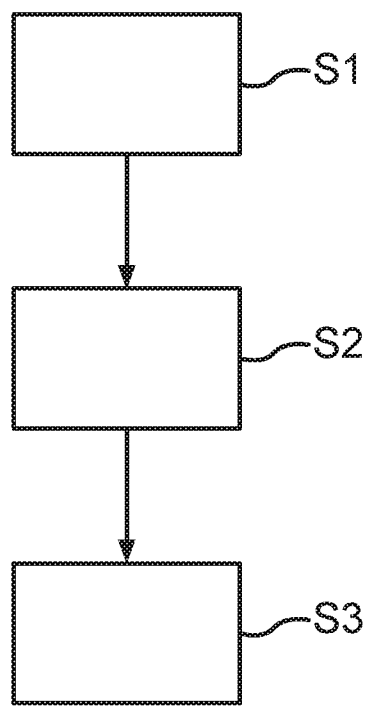
FIG. 3 is a flow diagram for providing the lighting system.

With reference to the components shown and described in context of FIGS. 1 and 2, FIG. 3 shows a flow diagram for a method for providing the lighting system 22. In a first step S1 of the method, the multiple optical fibers 26a and the multiple further fibers 26b are woven to a two-dimensional fiber fabric. In a second step S2 of the method, the developed surface 18 of the body 16 is captured and developed. In a final third step S3 of the method, the fiber fabric 28 is formed corresponding to the developed surface 18 of the body 16. The second step S2 can be performed temporally before, after or at the same time with the first step S1. In particular, the third step S3 can be effected temporally after the first step S1 and the second step S2. Alternatively or additionally, it can be provided that the first step S1 and the third step S3 are performed in combined manner, wherein the developed surface 18 of the body 16 is taken into account already in producing the fiber fabric 28.

The lighting system 22 is based on the realization that a light production in the motor vehicle 10, in particular from an interior (internal space 12), plays an increasingly important role. Herein, light can for example be integrated in an installation space of a vehicle door, an instrument panel (ipanel) of a center console and/or a vehicle seat. Hereto, a surface-structured fiber mat (fiber fabric 28) can also be used for an extensive light application, which allows besides a flat construction (package) also positioning of an actual light source (coupling-in device 25) on/in an alternative installation space. A textile (fiber fabric 28) created by weaving for example includes polymer-optical weft threads (each of the multiple optical fibers 26a) and multiple polyester threads without optical effect as warp threads (each of the multiple non-optical fibers), which only stabilize such a knitted fabric. By structuring the optical fibers 26a (POF threads) and coupling in light at an optical interface (e.g. coupling element 38 formed as a ferrule), a lateral light exit from the fiber mat 28 can be allowed. The fiber mat 28 can also be only partially activated or "holes" can be realized in weaving, through which the optical, i.e. light conducting, fibers 26a can be guided.

However, currently, a method is not known to the applicant, by which the severely deformed three-dimensional body 16, such as a gearshift lever (gear stick or selector lever 14) can be lighted all over. Especially a member size or an already integrated functionality prevents an extensive member illumination. Existing methods require an increased construction height, which is not admissible in such an application in the motor vehicle 10 and injection molded light guides (optical fibers 26a) do not allow a pronounced three-dimensionality, respectively. The fiber mat activated in terms of light (fiber fabric 28 with gap 44) is usually used for a slightly deformed two-dimensional structure such as for an area light in the vehicle door or on the instrument panel.

In order to counteract this, both weft and warp threads can be woven and activated, respectively, by optical polymeric fibers (i.e. the multiple optical fibers 26a as well as the multiple further fibers 26b formed as further optical fibers) in producing the fiber mat 28 and be equipped with a ferrule (coupling element 38) in the non-woven area as desired. By the advantageous cutting of the fiber mat 28, one obtains a flexible two-dimensional lighting surface, which can be pulled over/deformed on any three-dimensional shape by folding. In addition, it can be transilluminated through a material capable of being transilluminated (protective layer 44 of perforated aluminum or leather and foils, respectively). A positioning of the light source (coupling-in device 25) at the interface of the ferrule 38 is freely selectable due to a flexibility of the fibers 26a, 26b according to installation space.

Hereby, a very low construction (e.g. ca. 1 mm for the fiber fabric 28) can arise. Furthermore, the shining three-dimensional body 16 can be realized by cutting and/or deforming shining individual parts (i.e. the multiple optical fibers 26a as well as the multiple further fibers 26b formed as further optical fibers) as well as the positioning of the coupling-in device 25 at another installation location.

In case of the gearshift lever 14 configured shining, a recommended gear change (corresponding to rotational speed), a drive mode and/or an engaged setting (e.g. P, D, R, . . . ) can for example be presented hereby.

For providing the lighting system 22, it can be produced as follows:

Producing the fiber mat 28
  Additionally weaving the existing fiber mat 28 with POF fibers (multiple optical fibers 26a) and/or providing the fiber mat 28 already comprising the POF fibers (multiple optical fibers 26a);
  Producing a cut design (developed surface 18) e.g. by laser cutting (laser cut);
  bundling individual fibers 26a, 26b in a shrinking hose (fiber bundle 34 with protective shell 36); and
  applying the ferrule 38.
Design of the fiber mat 28
  Constructively transferring the 3D body 16 to be realized with a layer (surface 18), which is separated at reasonable locations, such that a shape developable in 2D (developed surface 18) arises.

Integration
    Wrapping the 3D body 16 with the fiber mat 28 and bending ends of the fibers 26a, 26b such that a tight-fitting mesh is spanned around the body 16;
    Applying a translucent surface material (protective layer 44) over the fiber mat 28; and
    Laying the light transporting fiber bundle 34 in an installation space advantageous in terms of installation space and coupling in the ferrule 38 to the coupling-in device 25.

Overall, the examples show how a three-dimensional (3D) lighting body (body 16 with fiber fabric 28) for an interior application in an automobile (motor vehicle 10) can be provided.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in Superguide v. DIRECTV, 358 F3d 870, 69 USPQ2d 1865 (Fed. Cir. 2004).

The invention claimed is:

1. A lighting device for a motor vehicle, comprising:
multiple optical fibers and multiple further fibers,
    the multiple further fibers are formed as multiple further optical fibers or as multiple non-optical fibers,
    the multiple optical fibers and the multiple further fibers are woven to a two-dimensional fiber fabric,
    each optical fiber of the multiple optical fibers and each further optical fiber of the multiple further fibers respectively cut and separate at respective distal cut ends of the two-dimensional fiber fabric to protrude separated at respective fabric ends of the two-dimensional fiber fabric, so that the two-dimensional fiber fabric is formable to correspond to a surface with multiple sides at least partially delimiting a three-dimensional body,
    respective fiber bundles formed from a plurality of optical fibers of the multiple optical fibers and a plurality of further optical fibers of the multiple further fibers formed as the multiple further optical fibers, that protrude from the respective fabric ends,
    respective protective shells that jacket the respective fiber bundles and include respective coupling elements to couple light into the respective fiber bundles,
    the two-dimensional fiber fabric formed corresponding to the surface includes at least two lighting areas different from each other,
        a first lighting area, from among the at least two lighting areas, includes a fiber bundle among the respective fiber bundles with a coupling element among the respective coupling elements only on one side of the multiple sides, and
        a second lighting area, from among the at least two lighting areas, includes at least two fiber bundles among the respective fiber bundles, each second lighting area of the at least two lighting areas with a coupling element among the respective coupling elements, on at least two sides of the multiple sides, each side of the at least two sides arranged opposing each other and/or normally to each other.

2. A lighting system, comprising:
the lighting device according to claim 1,
the three-dimensional body with the surface, which includes the multiple sides of the three-dimensional body and at least partially delimits the three-dimensional body, and
the two-dimensional fiber fabric corresponding to the surface of the three-dimensional body.

3. The lighting system according to claim 2, wherein,
the two-dimensional fiber fabric is at least partially arranged on the surface of the three-dimensional body, and
the two-dimensional fiber fabric comprises at least one bending formation in form of a bending edge, a bending angle, or a bending radius, and/or
at least two edges of the two-dimensional fiber fabric abut on each other in a flush manner.

4. The lighting system according to claim 3, wherein,
the two-dimensional fiber fabric comprises a partially translucent protective layer, and/or
the two-dimensional fiber fabric is attached to the surface of the three-dimensional body by a joining material, wherein respective fiber fabrics of the two-dimensional fiber fabric are additionally fixed to each other.

5. The lighting system according to claim 2, wherein,
the three-dimensional body is a hollow body and the surface of the three-dimensional body comprises an opening to an internal space of the hollow body,
the multiple optical fibers and/or the multiple further fibers protruding from the two-dimensional fiber fabric are bendable to be bent towards the internal space of the hollow body through the opening,
the lighting system includes a coupling-in device, and
the fiber bundle guidable to the coupling-in device through the internal space to connect to the coupling-in device via a coupling element of the respective coupling elements in optically conducting manner.

6. The lighting system according to claim 3, wherein,
each optical fiber of the multiple optical fibers and/or each further optical fibers of the multiple further optical fibers formed as the multiple further optical fibers include a core and a coating enveloping the core, and
the coating comprises a gap, the gap is only arranged in a lift area of the two-dimensional fiber fabric.

7. A motor vehicle with the lighting system according to claim 3, wherein the three-dimensional body is arranged in an interior of the motor vehicle as a trim element and/or as an operating element.

* * * * *